Patented Aug. 27, 1946

2,406,339

UNITED STATES PATENT OFFICE 2,406,339

PRODUCTION OF RESINOUS MATERIALS

Darwin E. Badertscher and Henry G. Berger, Woodbury, and Richard B. Bishop, Pitman, N. J., assignors to Socony-Vacuum Oil Company, Incorporated, a corporation of New York No Drawing. Application October 30, 1942, Serial No. 463,894

7 Claims. (Cl. 260—51)

This invention has to do with the production of phenol-formaldehyde type resins.

Resins of the phenol-aldehyde type, that is, those obtained by the condensation of a phenol and an aldehyde, are well known to those familiar with the art. Numerous procedures have been proposed for the preparation of these resins; in general, catalytic procedures have been more successful than the non-catalytic. Various acids, bases and salts have all been credited with the ability to facilitate the condensation of phenol and formaldehyde and thereby produce resins of different degrees of solubility in acids, bases and solvents, color, toughness, stability, etc. Unless great care is exercised in their preparation, the resins of this type tend to be dark in color and relatively unstable to the action of light and air. The decolorization of a dark resin of this type, or the precautions necessary for the preparation of a light-colored resin, appreciably increases the cost of the resin.

This invention is predicated upon the discovery that the condensation of phenol with formaldehyde, and more broadly the condensation of a hydroxylated aromatic or hydroxylated hydroaromatic hydrocarbon with an aldehyde, is aided by hydrogen fluoride. The resins obtained by such condensation are light-colored, and as such are more desirable than those obtained with other acidic condensation agents.

The condensation contemplated herein is adapted for resinification of hydroxylated aromatic or hydroxylated hydroaromatic compounds with all aliphatic and aromatic aldehydes, typical of which are formaldehyde, acetaldehyde, butyraldehyde, benzaldehyde, etc., in the presence of HF. Preference is given to the aliphatic aldehydes and particularly preferred herein is formaldehyde.

As aforesaid, hydroxylated aromatic or hydroxylated hydroaromatic hydrocarbons condense with the foregoing aldehydes in the presence of hydrogen fluoride. Mono- and poly- hydroxylated, mono- and poly- cyclic aromatic hydrocarbons are contemplated herein and representative of which are the following: phenol, cresols, p-tertiary butyl phenol, p-tertiary amyl phenol, resorcinol, alpha- and beta- naphthols, mono- and poly- hydroxy methyl naphthalenes, mono- and poly- hydroxy polymethyl naphthalenes, etc. Phenol, cresol, p-tertiary butyl phenol and p-tertiary amyl phenol are particularly preferred hydroxylated aromatic hydrocarbons for the purposes of this invention. In place of a hydroxylated aromatic hydrocarbon, a hydroxylated hydroaromatic hydrocarbon may be employed.

The process contemplated herein for the production of phenol-formaldehyde resins involves the following: Phenol and formaldehyde, for example, are allowed to react in the presence of hydrogen fluoride which may be anhydrous or in aqueous solution. Formaldehyde may be used in the gaseous phase, aqueous solution or solid phase. The amount of hydrogen fluoride used may be varied considerably; however, about 5 per cent to about 20 per cent by weight of the reactants is preferred. The reaction or condensation may be carried out at low temperatures, such as, for example, room temperature (20–25° C.) or below, or at elevated temperatures. At low temperatures, such as 20–25° C., however, the reaction is very slow, particularly when aqueous hydrogen fluoride is used as the condensing agent. Also, the hydroxylated aromatic or hydroxylated hydroaromatic compounds used are often solid at such temperatures and inefficient mixing of the reactants may result. A preferred temperature range is from about 80° C. to about 120° C. It is beneficial to stir the reaction mixture during the course of the reaction or condensation. Naturally, in view of the action of hydrogen fluoride on glass, it is desirable to use a metallic reaction vessel such as one of copper, stainless steel or iron. The reaction product is washed with large quantities of water to remove hydrogen fluoride and any water-soluble products formed in the reaction. The water-insoluble resinous reaction products are separated from the water washings and dried.

Although the proportions of the reactants, aldehyde and hydroxylated aromatic or hydroxylated hydroaromatic hydrocarbon, may be varied considerably in order to obtain resins with varying properties, it is preferred that a slightly larger molar quantity of aldehyde than said hydroxylated aromatic or hydroxylated hydroaromatic hydrocarbon be used. For example, to obtain a truly infusible phenol-formaldehyde resin, a ratio of about 7 mols of formaldehyde to about 6 mols of phenol is preferred.

The following examples serve to illustrate the new process and the resins obtained thereby.

Example I

A mixture of 160 grams of phenol, 160 grams of 37% aqueous formaldehyde solution and 50 cc. of 48% hydrofluoric acid was stirred in an open copper vessel for ten minutes. No visible evidence of reaction was observed. The copper vessel was then placed on a hot-plate and the contents heated, with agitation, to about 100° C. for about fifteen minutes. The mixture foamed considerably and an insoluble gummy material separated. The beaker was then removed from the hot-plate, the contents were stirred for five minutes more and the reaction mixture was then drowned in cold water. A water-insoluble resinous material was separated from the water phase and repeatedly leached with water. It was then dried thoroughly. One hundred and ninety grams of a hard, infusible, light-ivory colored resin was thus obtained.

Example II

A mixture of 92 grams of phenol, 80 cc. of 37% aqueous formaldehyde and 4 cc. of 48% hydrofluoric acid was stirred and heated to about 100° C. in a copper beaker on a hot-plate. The reaction mixture became taffy-like in consistency after drowning in water. The insoluble, viscous material was washed well with water. The material remained soft, was pink in color and did not harden when spread and worked on a hot-plate with a spatula.

Example III

A mixture of 164 grams of p-tertiary amyl phenol, 80 grams of 37% aqueous formaldehyde and 38 grams of 48% hydrofluoric acid was stirred and boiled in an open copper beaker at about 110° C. for thirty minutes. After washing and drying, as described above in Example I, 160 grams of an off-white solid resin, which hardened when melted, spread and worked with a spatula on a 150° C. hot-plate, were obtained.

Example IV

A mixture of 150 grams of p-tertiary butyl phenol, 95 grams of 37% formaldehyde and 35 grams of 48% aqueous hydrofluoric acid was stirred and heated at about 110° C. for 45 minutes. By working up and washing, as described above in Example I, 149 grams of a light-amber solid resin, which hardened when melted, spread and worked with a spatula on a 150° C. hot-plate, were obtained.

It is to be understood that the foregoing examples are illustrative only and that the invention is not limited thereto, rather the invention is to be construed broadly as coming within the scope of the appended claims.

We claim:

1. In a process for the production of a resinous product by the condensation, in the presence of an acid condensing agent, of formaldehyde and a material selected from the group consisting of phenols and cyclohexanol, the improvement affording a substantially reduced reaction time and a light colored product which comprises condensing said formaldehyde and said material in the presence of hydrogen fluoride whereby the reaction time is substantially decreased as compared with other acid condensation catalysts without substantial darkening of the product.

2. In a process for the production of a resinous product by the condensation, in the presence of an acid condensing agent, of formaldehyde and a phenol, the improvement affording a substantially reduced reaction time and a light colored product which comprises condensing said formaldehyde and said phenol in the presence of hydrogen fluoride whereby the reaction time is substantially decreased as compared with other acid condensation catalysts, without substantial darkening of the product.

3. In a process for the production of a resinous product by the condensation, in the presence of an acid condensing agent, of formaldehyde and phenol, the improvement affording a substantially reduced reaction time and a light colored product which comprises condensing said formaldehyde and said phenol in the presence of from about 5 per cent to about 20 per cent by weight of hydrogen fluoride based on the weight of the reactants whereby the reaction time is substantially decreased as compared with other acid condensation catalysts, without substantial darkening of the product.

4. In a process for the production of a resinous product by the condensation, in the presence of an acid condensing agent, of formaldehyde and phenol, the improvement affording a substantially reduced reaction time and a light colored product which comprises condensing said formaldehyde and said phenol at a temperature of from about 80° C. to about 120° C. in the presence of from about 5 per cent to about 20 per cent by weight of hydrogen fluoride based on the weight of the reactants whereby the reaction time is substantially decreased as compared with other acid condensation catalysts, without substantial darkening of the product.

5. In a process for the production of a resinous product by the condensation, in the presence of an acid condensing agent, of formaldehyde and phenol, the improvement affording a substantially reduced reaction time and a light colored product which comprises condensing said formaldehyde and said phenol in the molar ratio of about 7:6 at a temperature of from about 80° C. to about 120° C. in the presence of hydrogen fluoride whereby the reaction time is substantially decreased as compared with other acid condensation catalysts without substantial darkening of the product.

6. In a process for the production of a resinous product by the condensation, in the presence of an acid condensing agent, of formaldehyde and tertiary butyl phenol, the improvement affording a substantially reduced reaction time and a light colored product which comprises condensing said formaldehyde and said tertiary butyl phenol in the presence of hydrogen fluoride whereby the reaction time is substantially decreased as compared with other acid condensation catalysts, without substantial darkening of the product.

7. In a process for the production of a resinous product by the condensation, in the presence of an acid condensing agent, of formaldehyde and tertiary amyl phenol, the improvement affording a substantially reduced reaction time and a light colored product which comprises condensing said formaldehyde and said tertiary amyl phenol in the presence of hydrogen fluoride whereby the reaction time is substantially decreased as compared with other acid condensation catalysts, without substantial darkening of the product.

DARWIN E. BADERTSCHER.
HENRY G. BERGER.
RICHARD B. BISHOP.